United States Patent
Erb et al.

(10) Patent No.: US 8,332,102 B2
(45) Date of Patent: Dec. 11, 2012

(54) VEHICLE SAFETY SYSTEM

(75) Inventors: Yannick Erb, Timis (RO); Yann le Merrer, Paris (FR); Sylvain Triquigneaux, Lyons (FR); Andreas Wallin, Billdal (SE); Peter Hardå, Göteborg (SE)

(73) Assignees: Autoliv Development AB, Vargarda (SE); Ford Global Technologies, LLC, Dearborn, MI (US)

( * ) Notice: Subject to any disclaimer, the term of this patent is extended or adjusted under 35 U.S.C. 154(b) by 551 days.

(21) Appl. No.: 12/445,330

(22) PCT Filed: Sep. 21, 2007

(86) PCT No.: PCT/SE2007/000828
§ 371 (c)(1),
(2), (4) Date: Apr. 9, 2010

(87) PCT Pub. No.: WO2008/048159
PCT Pub. Date: Apr. 24, 2008

(65) Prior Publication Data
US 2010/0198446 A1   Aug. 5, 2010

(30) Foreign Application Priority Data

Oct. 16, 2006   (GB) .................................. 0620530.6

(51) Int. Cl.
*G06F 7/00* (2006.01)
*G06F 17/00* (2006.01)
*B60R 22/00* (2006.01)
*E05F 15/00* (2006.01)
*G05D 1/00* (2006.01)
*G05D 3/00* (2006.01)

(52) U.S. Cl. ......... 701/45; 701/36; 280/735; 280/730.2; 280/730.1; 180/274; 180/282

(58) Field of Classification Search ................... 701/45, 701/36; 280/735, 730.2, 730.1; 180/274, 180/282

See application file for complete search history.

(56) References Cited

U.S. PATENT DOCUMENTS

| | | | |
|---|---|---|---|
| 6,300,866 B1 | 10/2001 | Foith | |
| 6,390,498 B1 | 5/2002 | Francis | |
| 6,484,080 B2 | 11/2002 | Breed | |
| 6,553,295 B1 | 4/2003 | Bauch | |
| 2005/0206142 A1 | 9/2005 | Praka-Asante | |

FOREIGN PATENT DOCUMENTS

| | | |
|---|---|---|
| GB | 2 427 712 | 6/2006 |
| JP | 09-136659 | 5/1997 |
| JP | 2006-273069 | 10/2006 |

OTHER PUBLICATIONS

International Search Report and Written Opinion of PCT/SE2007/000828.

*Primary Examiner* — Thomas Tarcza
*Assistant Examiner* — Kevin Myhre
(74) *Attorney, Agent, or Firm* — Brinks Hofer Gilson & Lione

(57) ABSTRACT

A vehicle safety system for detecting a side impact, the system comprising at least one sensor operable to detect one or more parameters relating to the rate of yaw of the vehicle, and to provide an output that is dependent upon the longitudinal position along the vehicle of the side impact.

17 Claims, 3 Drawing Sheets

VEHICLE SAFETY SYSTEM

CROSS REFERENCE TO RELATED APPLICATION

This application claims priority to PCT/SE2007/000828 filed Sep. 21, 2007 and Great Britain application 0620530.6 filed Oct. 16, 2006, the entire contents of which are herein incorporated by reference.

FIELD

This invention relates to a vehicle safety system, and in particular concerns a system for detecting a side impact and activating a passive impact protection arrangement, such as an air-bag or inflatable curtain, in response to the detected impact.

BACKGROUND

Conventional vehicle side impact detection systems for triggering passive safety devices, such as an air-bag mounted in the door or seat of a vehicle or an inflatable side curtain, are normally configured to detect objects striking the front or rear doors, or the B pillar of a vehicle. Such detection arrangements typically comprise one or more accelerometers and/or pressure sensors mounted in the front or rear side doors, or in the B pillar. In particular, the zone in which impacts are detected is between the A pillar and the C pillar, and impacts occurring in this region are known as "in-zone" impacts. However, "off-zone" side impacts, involving objects striking the vehicle in front of the A pillar or behind the C pillar, may be severe, and may often not be detected by conventional side impact detectors. Thus a need exists to provide a vehicle side impact detection system that ameliorates one or more of the above problems.

SUMMARY

One objective of the present invention is to provide a vehicle safety system for detecting a side impact, the system comprising at least one sensor operable to detect one or more parameters relating to the rate of yaw of the vehicle, and to provide an output which is dependent upon the longitudinal position along the vehicle of the side impact. The vehicle safety system further comprises a processor operable to output an activation signal to activate a vehicle safety system if it is determined from at least one parameter that a side impact is occurring or has occurred. Preferably, the activation signal is output when the detected yaw is above a predetermined threshold.

According to one aspect of the present invention, the activation signal is output when the angular acceleration of the vehicle is above a predetermined threshold. The activation signal may be output if it is determined that the rate of yaw and the angular acceleration of the vehicle are above their respective thresholds. Preferably, the activation signal is output if it is determined that the rate of change of angular acceleration of the vehicle is above a predetermined threshold.

According to another aspect of the present invention, the activation signal is output when it is determined that the lateral acceleration or a parameter relating to the lateral acceleration of the vehicle exceeds a predetermined threshold. Preferably, the processor is operable to output the activation signal if it is determined that an off-zone side impact is occurring or has occurred, and wherein the safety system is further able to determine whether an in-zone side impact is occurring or has occurred.

According to yet another aspect of the present invention, the activation signal is output when it is determined that an in-zone or off-zone side impact is occurring or has occurred. In other words, an in-zone activation signal is output when it is determined that an in-zone side impact is occurring or has occurred, and an off-zone activation signal is output when it is determined that an off-zone side impact is occurring or has occurred.

In one embodiment of the present invention, the processor of the vehicle safety system is operable to make a determination as to the longitudinal position along the vehicle of the side impact. The at least one sensor of the vehicle safety system may comprise a gyroscope or at least two accelerometers. Preferably, the accelerometers are displaced from one another in a direction which is substantially parallel with the longitudinal axis of the vehicle. However, the accelerometers may be displaced from one another in a direction which is substantially perpendicular to the longitudinal axis of the vehicle.

According to one aspect of the present invention, the accelerometers may be sensitive to acceleration perpendicular or parallel to a line connecting the accelerometers. Preferably, the accelerometers are sensitive to acceleration parallel with a line connecting the accelerometers.

According to another aspect of the present invention, the at least one sensor comprises a gyroscope and at least two accelerometers, and wherein the parameter relating to the yaw of the vehicle is determined from the acceleration sensed by the two accelerometers, and also from the gyroscope.

Another embodiment of the present invention provides a method for detecting a side impact to a vehicle, comprising the steps of: detecting one or more parameters relating to the rate of yaw of the vehicle; and providing an output, based at least on the one or more parameters, which is dependent upon the longitudinal position along the vehicle of the side impact. The method may further comprise the step of outputting an activation signal to activate a passive impact protection arrangement if it is determined from the at least one parameter that a side impact is occurring or has occurred. Preferably, the method comprises a step of making a determination as to the longitudinal position along the vehicle of the side impact.

A further aspect of the present invention provides a computer program comprising a computer program code operable to perform all of the steps of the above method when run on a computer. The computer program according to the above, may be embodied on a computer readable medium.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
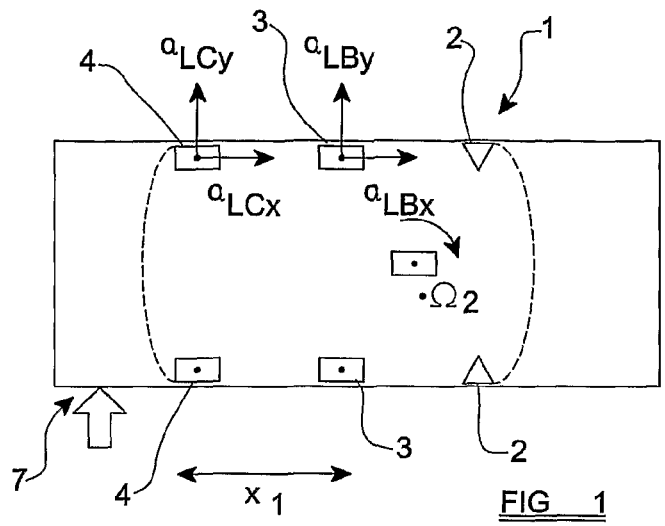
FIG. 1 is a schematic representation of a vehicle subject to an off-zone side impact.

The following description is merely exemplary in nature and is in no way intended to limit the present disclosure or its application or uses. It should be understood that throughout the description and drawings, corresponding reference numerals indicate like or corresponding parts and features.

Referring to FIG. 1, a schematic view of a vehicle 1 is shown. The vehicle, whose forward direction of travel is to the right in FIG. 1, has left and right A pillars 2, B pillars 3 and C pillars 4, as will be understood by those skilled in the art. The distance between the B pillar 3 and C pillar 4 on each side is $x_1$.

Each of the A, B and C pillars 2,3,4 is provided with one or more accelerometers and is operable to detect the acceleration of the pillar in question 2,3,4 in a direction parallel with the longitudinal axis (i.e. parallel with the forward direction of travel) of the vehicle, and also perpendicular to this direction.

The vehicle 1 may also have a gyroscopic yaw sensor 5, which may be located anywhere within the vehicle but in the embodiment shown in FIG. 1 is located forward of the centre of gravity 6 of the vehicle. It is envisaged that a gyroscopic sensor may be provided in the vehicle for another purpose, for instance navigation or vehicle control (such as ESP), and it is preferred that the signal from a single gyroscope is used for both purposes.

The vehicle 1 is subject to an off-zone side impact, at a point 7 behind the right-hand C pillar 4. Angular momentum will be imported to the vehicle by the impact and the vehicle will therefore rotate around its yaw axis (which will be a vertical axis passing through the centre of gravity 6 of the vehicle 1) in a clockwise direction.

Since this off-zone side impact is likely to be undetected by any impact sensors located within the zone between the A and C pillars 2,4, the safety system embodying the present invention relies on detection of parameters relating to the yaw of the vehicle to determine whether a side impact has occurred. The yaw rate $\Omega_z$ may be determined through the use of a gyroscopic yaw sensor or derived from the accelerations detected at the B and C pillars 3,4 in a direction parallel with the longitudinal axis of the vehicle according to Equation 1:

$$a_{LBx} - a_{LCx} = x_1 \cdot \Omega_z^2 \qquad \text{Eq. 1}$$

where $a_{LBx}$ and $a_{LCx}$ are the detected accelerations at the B and C pillars 3,4 respectively. It should be noted that this is the case when these accelerometers are placed at the same lateral distance from the longitudinal axis of the vehicle).

Alternatively, $\Omega_z$ may be derived from the accelerations detected at the B and C pillars 3,4 in a direction perpendicular to the longitudinal axis of the vehicle according to Equations 2 and 3:

$$a_{LBy} - a_{LCy} = x_1 \cdot \dot{\Omega}_z \qquad \text{Eq. 2}$$

$$\Omega_z = \int \dot{\Omega}_z \partial t \qquad \text{Eq. 3}$$

where $a_{LBy}$ and $a_{LCy}$ are the accelerations detected at the left-hand B and C pillars 3,4 respectively. Once again, this occurs when these accelerometers are placed at the same lateral distance from the longitudinal axis of the vehicle.

One skilled-in-the-art will understand that the output from the sensors is dependent upon the longitudinal position along the vehicle of a side impact. It is preferable not to use accelerations detected on the side of the vehicle which has suffered an impact to detect the rate of yaw. This is because some distortion of the vehicle may have occurred on the side which has suffered an impact, and hence the result obtained may be unreliable. Vibrations are also likely to be less severe on the side of the vehicle furthest from the impact. To determine the side of the vehicle on which the impact has occurred, the average lateral acceleration of the vehicle may be considered.

Figure 2:
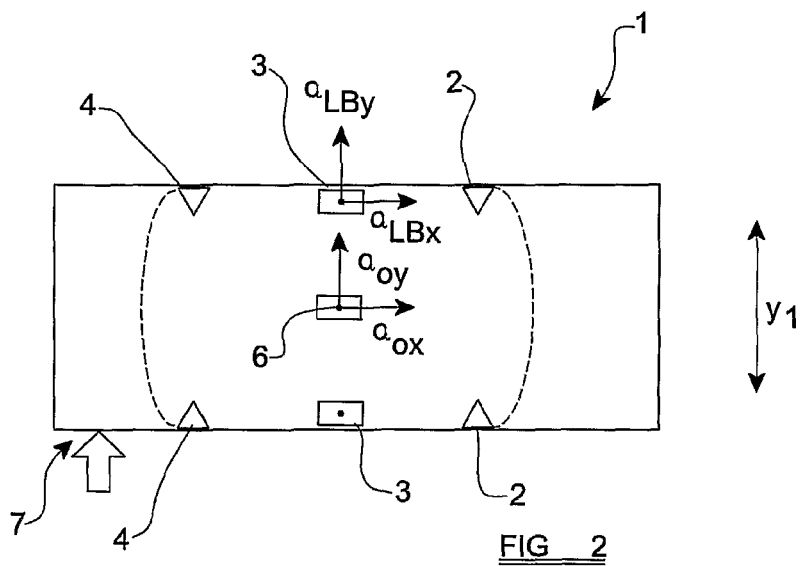
FIG. 2 is another schematic representation of a vehicle subject to an off-zone side impact.

In another embodiment of the invention, one or more accelerometers 8 may also be provided at or near the centre of gravity 6 of the vehicle 1, as shown in FIG. 2, once again able to detect acceleration of the vehicle parallel with, and perpendicular to, the normal direction of forward motion of the vehicle. The variable $y_1$ is the distance between the centre of gravity 6 of the vehicle 1 and the left or right B pillars 3.

In this embodiment, $\Omega_z$ may be determined from the detected accelerations as shown in Equation 4 or 5:

$$a_{LBx} - a_{0x} = -y_1 \cdot \dot{\Omega}_z \text{ or} \qquad \text{Eq. 4}$$

$$a_{LBy} - a_{0y} = y_1 \cdot \Omega_z^2 \qquad \text{Eq. 5}$$

where $a_{ox}$ and $a_{oy}$ are the accelerations detected at the centre of gravity 6 of the vehicle 1 in directions parallel with, and perpendicular to the longitudinal axis of the vehicle respectively. It should be noted that this is only the case if these accelerometers have the same longitudinal position.

In order to determine whether a side impact of sufficient severity to warrant activation of a passive side impact protection device has occurred, the safety system may compare the detected rate of yaw with a threshold, and output a signal to activate a suitable side impact protection device if the rate of yaw exceeds the threshold.

Alternatively, or in addition, the angular acceleration of the vehicle (i.e. rate of change of the yaw rate) may be compared with a threshold, and a safety device activated if the threshold is exceeded. As a further possibility, either as an alternative to or in conjunction with either or both of the above, the rate of change of angular acceleration, which provides a measure of angular "jerk," may be used.

Figure 3:
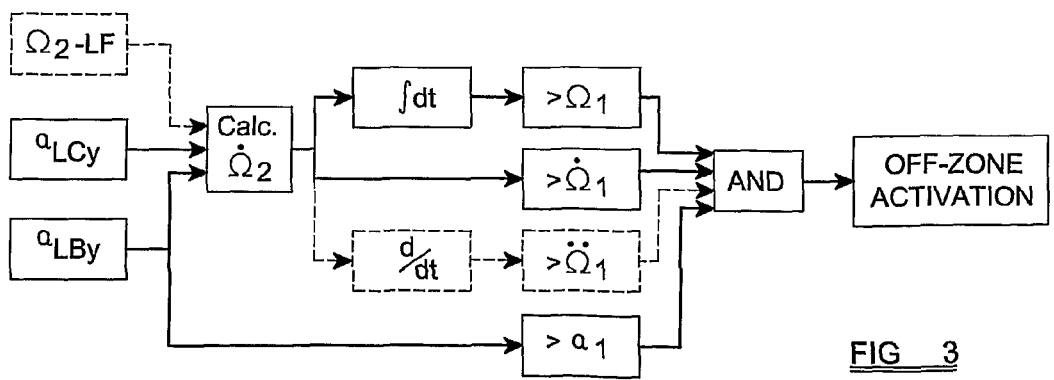
FIG. 3 is a schematic representation of an algorithm for detecting side impacts with off-zone activation according to the teachings of the present invention.

Referring now to FIG. 3, a schematic view is shown of an algorithm which may be used in conjunction with the present invention. Data is gathered from the accelerometers positioned in the left-hand B and C pillars 3,4, from the centre of gravity of the vehicle if accelerometers have been provided at this location, and also optionally from the gyroscope 5. The outputs from the sensors are delivered to a processor, which calculates the angular acceleration as shown above.

The processor further performs an integration of the calculated angular acceleration with respect to time to calculate the yaw rate, (which may also have been determined from signals output by the gyroscope) and may further optionally calculate the derivative of the angular acceleration with respect to time to obtain the rate of change of angular acceleration.

The angular acceleration is then compared with a threshold. If the angular acceleration exceeds this threshold, then an activation signal may be output by the safety system, to activate a passive side impact protection system. The mode of deployment of such passive systems may vary in dependence upon the location of the impact, as will be discussed in more detail below. Preferably, however, at least one confirmation criterion is used to improve the reliability of the system and to reduce the likelihood of a passive side impact protection system being deployed inappropriately.

In the present example, as one confirmation criterion the yaw rate, obtained by integrating the angular acceleration with respect to time, is compared with a threshold, and if the yaw rate is below the threshold then the passive side impact protection system will not be activated. Although under certain types of event the instantaneous angular acceleration may be relatively high, the yaw rate may remain low and in such cases it is likely that the side impact is not sufficiently severe to warrant the activation of a passive side impact protection safety system, or indeed that no side impact has occurred.

A further confirmation criterion may be provided by comparing the lateral acceleration detected at the left-hand B pillar 3 (the acceleration in a direction perpendicular to the normal direction and forward motion of the vehicle) with a predetermined threshold, and if this acceleration does not exceed the threshold then the passive side impact protection device will not be initiated. It is considered that a side impact of sufficient severity to warrant the activation of a passive side impact protection device will cause lateral acceleration of the entire vehicle, and if it is determined that this lateral acceleration is below a certain threshold then it is likely to be inappropriate to activate a safety device.

If the rate of angular acceleration, the yaw rate and the lateral acceleration of the left-hand B pillar 3 all exceed the respective thresholds, then the passive side impact protection device will be activated.

In general, at least one of the yaw rate, the angular acceleration or the rate of change of angular acceleration is analysed to determine whether a side impact has occurred or is occurring, and at least one more of these quantities, and/or another parameter (such as the lateral acceleration of the vehicle) is analysed as a confirmation criterion.

In preferred embodiments of the invention, the safety system will react in different ways to a side impact which is determined to have occurred in-zone (i.e. between the A and C pillars 2,4 of the vehicle), and to a side impact which is determined to the off-zone. This is because, in the case of an in-zone impact, the protection of the vehicle occupants from the impact itself will be of primary concern, and hence the deployment of passive side impact protection devices such as air-bags and inflatable curtains between the point of impact and the vehicle occupants will take place.

However, in the event of an off-zone side impact, the impact itself is unlikely to harm the vehicle occupants directly, but the resulting rotation of the vehicle may cause injury to vehicle occupants. For instance, in the case of an off-zone side impact as shown in FIG. 1, where an object strikes the vehicle behind the right-hand C pillar 4, the vehicle 1 will rotate clockwise around its centre of gravity 6, and an occupant sitting in the left-hand front seat may be thrown against the inside of the left-hand front door—in such a case, a side air-bag or inflatable side curtain may need to be deployed between the left-hand front door and an occupant in the left-hand front seat, and this air-bag or inflatable curtain is located some distance from the point of impact. The manner in which passive protection systems are activated in response to the detection of an off-zone side impact may therefore be rather different to the manner in which such systems are deployed following an in-zone impact. It is also envisaged that the manner of activation will be different fro impacts that cause clockwise and anti-clockwise rotation of the vehicle.

Figure 4:
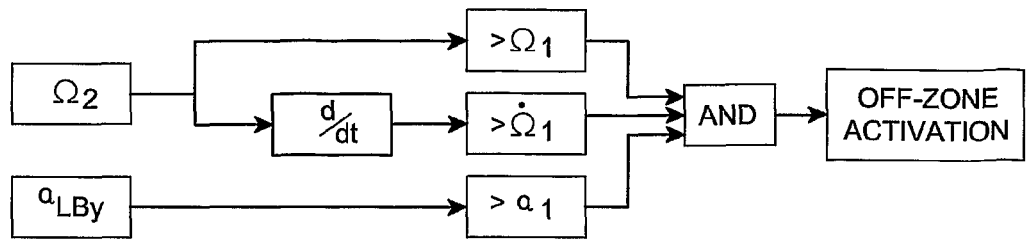
FIG. 4 is a schematic representation of another algorithm for detecting side impacts with off-zone activation according to another aspect of the present invention.
Figure 5:
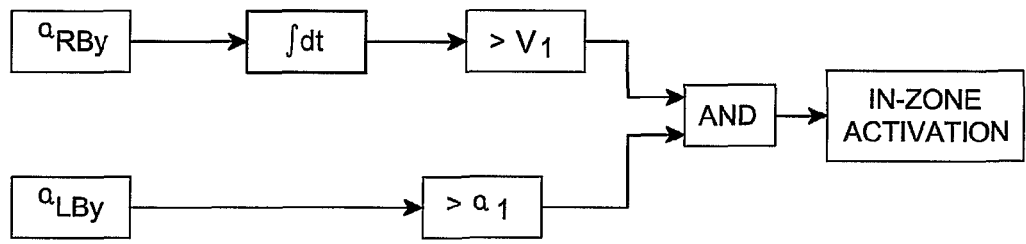
FIG. 5 is a schematic representation of an algorithm for detecting side impacts with in-zone activation according to one aspect of the present invention.

FIGS. 4 and 5 show schematic representations of algorithms which may be used to determine whether an on-zone or off-zone protection mode may need to be activated. Turning to FIG. 4, the rate of yaw is determined from the gyroscope 5, and the rate of angular acceleration is determined by calculating the derivative of the rate of yaw with respect to time. If both the rate of yaw and the rate of angular acceleration exceed respective thresholds, and the lateral angular acceleration also exceeds a predetermined threshold (as a confirmation criterion, as discussed above) then the safety system will output an activation signal to activate one or more passive impact protection devices in an off-zone mode.

Turning to FIG. 5, the acceleration detected at the right-hand B pillar 3 is detected, and this detected acceleration is integrated with respect to time to obtain the lateral speed of the right-hand B pillar. If this speed exceeds a preset threshold, and (as a confirmation criterion) the acceleration of the left-hand B pillar also exceeds a preset threshold, then the safety system will conclude that an in-zone side impact has occurred and output an activation system to activate at least one passive side impact protection device in an in-zone mode.

Figure 7:
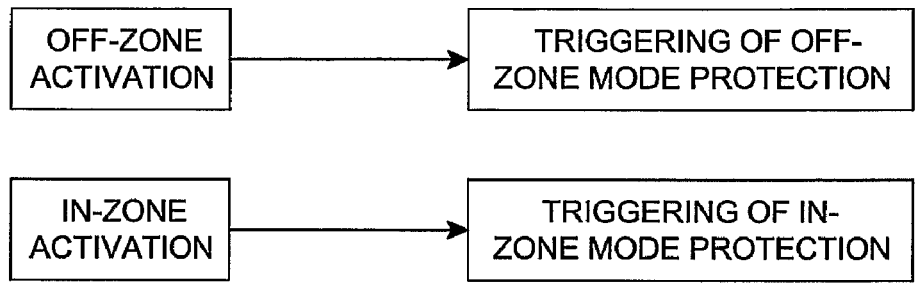
FIG. 7 is a schematic representation of off-zone activation triggering off-zone mode protection and in-zone activation triggering in-zone mode protection according to one aspect of the present invention.

These different algorithms may be executed simultaneously, as shown in FIG. 7, with each algorithm triggering the appropriate protection mode if the necessary criteria are fulfilled. It will be appreciated that this may lead to both protection modes being activated.

Figure 6:
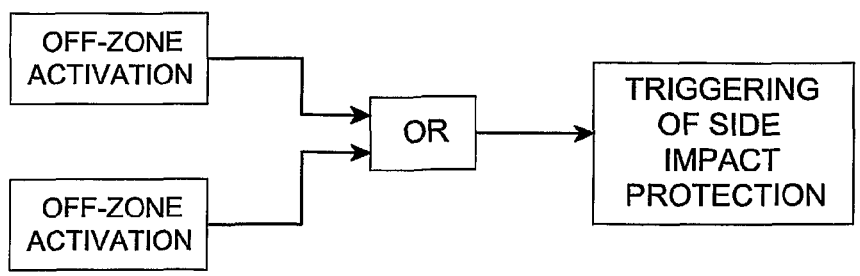
FIG. 6 is a schematic representation of an algorithm for detecting side impacts with triggering of side impact protection according to one aspect of the present invention.

Alternatively, as shown in FIG. 6, the safety system may have only one side impact protection mode, which may be triggered by the off-zone impact determination algorithms of FIG. 3 or 4, or by an in-zone impact detection algorithm, for instance that shown in FIG. 5.

Figure 8:
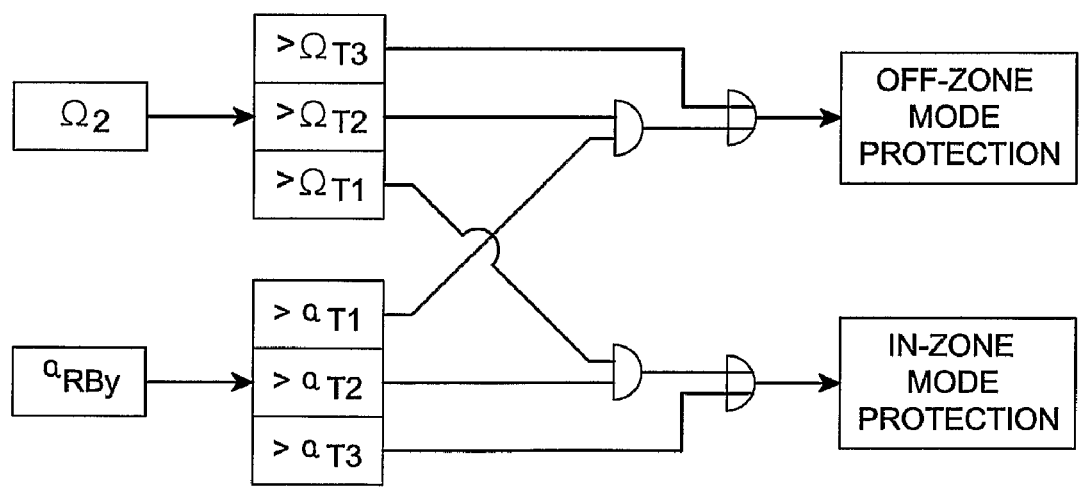
FIG. 8 is a schematic representation of an algorithm for detecting side impacts with off-zone and in-zone mode protection according to one aspect of the present invention.

FIG. 8 is a schematic representation of an algorithm to determine, from sensed yaw rate and lateral acceleration, whether passive vehicle side impact protection system should be deployed in an off-zone mode, in an in-zone mode, or both. Both yaw rate and lateral acceleration are categorised according to severity, with $\Omega_{T1}$ being the least severe yaw rate, $\Omega_{T2}$ being more severe than $\Omega_{T1}$, and $\Omega_{T3}$ being more severe than $\Omega_{T2}$. Similarly, $a_{T1}$ is the least severe acceleration, $a_{T2}$ being more severe than $a_{T1}$ and $a_{T3}$ being more severe than $a_{T2}$. A first AND gate 9 receives a signal when the lateral acceleration is $a_{T1}$ or above and when the yaw rate is $\Omega_{T2}$ or above, and a second AND gate 10 receives a signal when the lateral acceleration is $a_{T2}$ or above and the yaw rate is $\Omega_{T1}$ or above.

A first OR gate 11 receives a signal when the output of the first AND gate 9 is 1, or when the yaw rate is $\Omega_{T3}$. A second OR gate 12 receives a signal when the second AND gate 10 outputs are 1, or when the acceleration is $a_{T3}$. One skilled-in-the-art will understand that when there is no angular rotation, the in-zone protection mode will be activated only when the lateral acceleration is $a_{T3}$.

When the yaw rate is $\Omega_{T1}$, the in-zone protection mode will be activated when the lateral acceleration is $a_{T2}$ or $a_{T3}$. When the yaw rate is $\Omega_{T2}$, the off-zone protection mode will be activated when the lateral acceleration is $a_{T1}$, $a_{T2}$ or $a_{T3}$, and the in-zone protection zone will additionally be triggered if the lateral acceleration is $a_{T3}$ or $a_{T3}$. Finally, when the yaw rate is $\Omega_{T3}$, the off-zone protection mode will always be triggered, with the in-zone protection mode being additionally triggered if the angular acceleration is $a_{T2}$ or $a_{T3}$.

One skilled-in-the-art will understand that embodiments of the present invention may provide adaptable and responsive vehicle safety systems for the activation of passive side impact protection systems in a manner which is appropriate for the type of impact that is occurring or has occurred. It will also be understood by those skilled-in-the-art that parameters related to the yaw of the vehicle may be used to distinguish between a front door impact and a rear door impact.

The foregoing description of various embodiments of the invention has been presented for purposes of illustration and description. It is not intended to be exhaustive or to limit the invention to the precise embodiments disclosed. Numerous modifications and variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A vehicle safety system for detecting and responding to a side impact of the vehicle, the system comprising
at least one sensor operable to detect one or more parameters relating to the rate of yaw of the vehicle, and to provide an output that is dependent upon the longitudinal position along the vehicle of the side impact;
a processor operable to output an activation signal to activate passive safety devices of the vehicle safety system if it is determined from the one or more parameters that a side impact is occurring or has occurred;
the processor operable to determine whether an in-zone side impact is occurring or has occurred and to determine if an off-zone side impact is occurring or has occurred;
an in-zone activation signal is output if it is determined that an in-zone side impact is occurring or has occurred and it is determined that a parameter relating to the lateral acceleration of the vehicle exceeds a first threshold, and an off-zone activation signal is output if it is determined that an off-zone side impact is occurring or has occurred and it is determined that at least one of the detected rate of yaw and angular acceleration of the vehicle exceeds a respective yaw threshold and angular acceleration threshold; and
the processor operable to selectively activate the passive safety devices in different ways depending on whether the side impact is determined to have occurred in-zone or off-zone.

2. A vehicle safety system according to claim 1, wherein the passive safety devices are selected as one from the group of front, rear, and side air bags, inflatable curtains, and combinations thereof.

3. A vehicle safety system according to claim 1, wherein the activation signal is output if it is determined that both the detected rate of yaw and angular acceleration of the vehicle are above the respective yaw and angular acceleration thresholds.

4. A vehicle safety system according to claim 1, wherein the processor is operable to make a determination as to the longitudinal position along the vehicle of the side impact.

5. A vehicle safety system according to claim 1, wherein the at least one sensor comprises a gyroscope.

6. A vehicle safety system according to claim 1, wherein the at least one sensor comprises at least two accelerometers.

7. A safety system according to claim 6, wherein the accelerometers are displaced from one another in a direction which is substantially parallel with the longitudinal axis of the vehicle.

8. A vehicle safety system according to claim 6, wherein the accelerometers are displaced from one another in a direction which is substantially perpendicular to the longitudinal axis of the vehicle.

9. A vehicle safety system according to claim 6, wherein the accelerometers are sensitive to acceleration perpendicular to a line connecting the accelerometers.

10. A vehicle safety system according to claim 6, wherein the accelerometers are sensitive to acceleration parallel with a line connecting the accelerometers.

11. A vehicle safety system according to claim 1, wherein the at least one sensor comprises a gyroscope and at least two accelerometers, and wherein the parameter relating to the yaw of the vehicle is determined from the acceleration sensed by the two accelerometers, and also from the gyroscope.

12. A method for detecting a side impact to a vehicle, comprising the steps of:
detecting one or more parameters relating to the rate of yaw of the vehicle;
providing an output, based at least on the one or more parameters, which is dependent upon the longitudinal position along the vehicle of the side impact;
outputting an activation signal to activate a passive impact protection arrangement when it is determined from the at least one parameter that a side impact is occurring or has occurred;
the step of outputting the activation signal further comprising the steps of
determining whether an in-zone side impact is occurring or has occurred and determining whether an off-zone side impact is occurring or has occurred;
outputting the activation signal as an in-zone activation signal if it is determined that an in in-zone side impact is occurring or has occurred and it is determined that a parameter relating to the lateral acceleration of the vehicle exceeds a first threshold, and
outputting the activation signal as an off-zone activation signal if it is determined that an off-zone side impact is occurring or has occurred and it is determined that the detected rate of yaw or angular acceleration of the vehicle exceeds a second threshold; and
causing the passive impact protection arrangement to react in different ways depending on whether the side impact is determined to be an in-zone side impact or an off-zone side impact.

13. A method according to claim 12, further comprising the step of making a determination as to the longitudinal position along the vehicle of the side impact.

14. A computer program comprising a computer program code stored in non-transitory memory of the vehicle safety system and operable to perform all of the steps of claim 12 when run on a computer forming a part of the vehicle safety system.

15. A computer program according to claim 14, embodied on a non-transitory computer readable medium.

16. A vehicle safety system according to claim 1, wherein when it is determined that an in-zone side impact is occurring or has occurred the output of the activation signal activates passive safety devices positioned between the point of impact and the occupants of the vehicle.

17. A vehicle safety system according to claim 1, wherein when it is determined that an off-zone side impact is occurring or has occurred the output of the activation signal activates passive safety devices positioned on the opposite side of the vehicle from the side of impact.

* * * * *